United States Patent Office 2,701,598
Patented Feb. 8, 1955

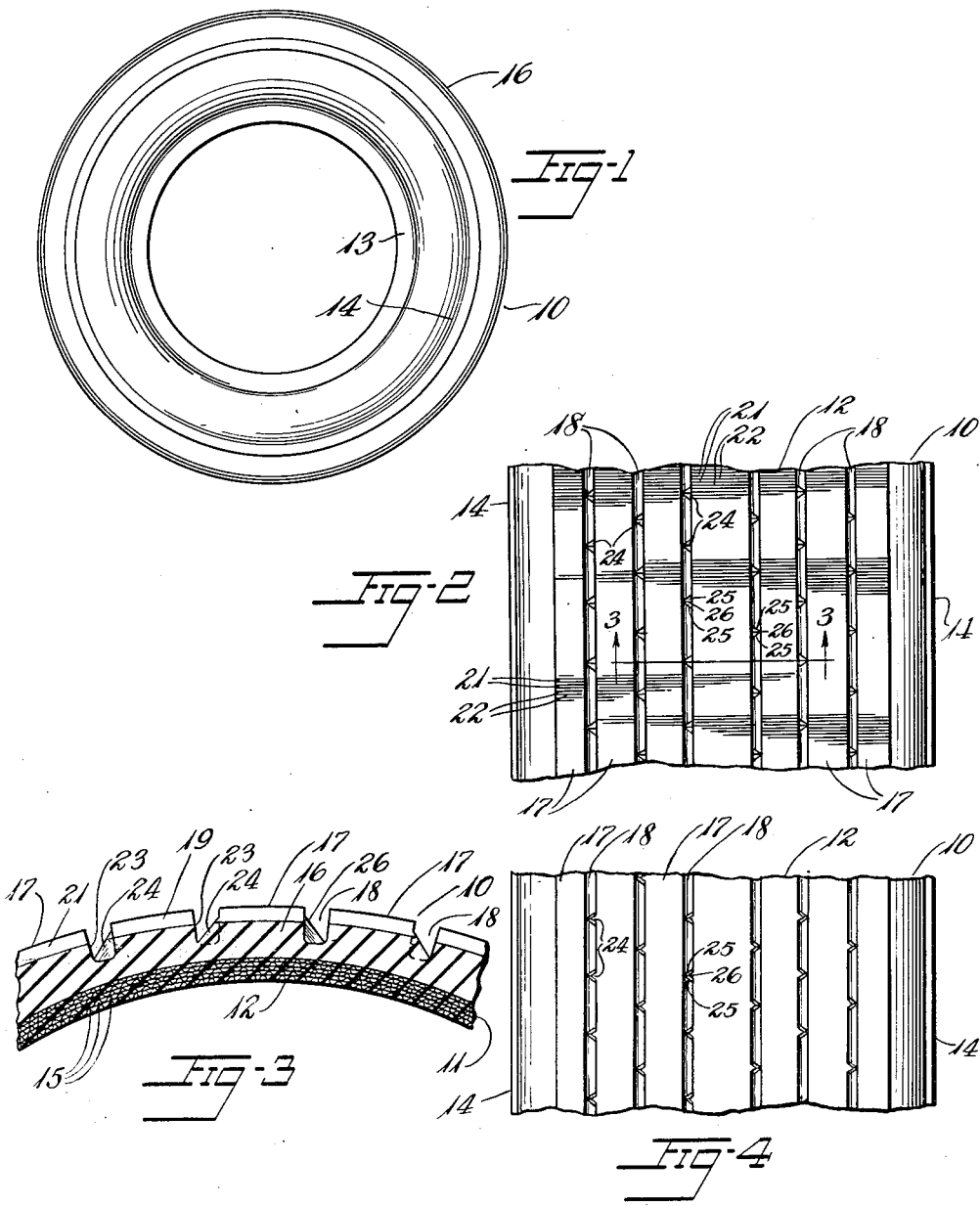

2,701,598

TIRE TREAD

Harold Gray, Akron, Ohio, assignor to The B. F. Goodrich Company, New York, N. Y., a corporation of New York Application September 25, 1951, Serial No. 248,156

1 Claim. (Cl. 152—209)

This invention relates to tire treads and especially to tire treads having circumferentially extending ribs which are divided into segments by a multiplicity of generally transverse slits.

The advantages of a tire tread having ribs which are divided into segments by transverse slits have been demonstrated in tests which have shown that tire treads with divided ribs have improved skid resistance, traction and wearing qualities. Usually the ribs are divided by slits which extend only part way through the ribs because of the difficulty in making tires with deeper slits and because deeper slits are not required for effective operation of the tires. The ribs have been molded with straight sides so that any sound produced by the segments of the ribs will not be increased by sounds produced by projections at the sides of the ribs. However, when straight side ribs have been used the skid resistance and traction of the tires has not been adequate after the divided segments have been worn away because in this condition of the tires no tread edges extending transversely of the tires have been left to resist skidding or to provide adequate traction.

The wearing qualities of tire treads with ribs divided into a multiplicity of segments have been found to be very good in tire treads which have closely spaced slits. Each of the segments is thin and highly flexible which is desirable because in operation the tread is sufficiently yieldable to permit conformance of the tread surface with irregularities in the ground for reducing abrasion of the tread. The flexibility of the ribs is limited and controlled by the disposition of the segments in closely spaced relation so that adjacent segments support each other. Furthermore the flexing takes place at a plurality of hinge points in the segments at positions of relatively thin cross section which is desirable because the flexing of the segments at these hinge points does not generate objectionable heat in the tire.

The optimum flexibility and elasticity of the divided portions of the ribs does not extend throughout the tread and tire body. Instead there is an abrupt decrease in these properties at the portion of the tread at the base of the ribs because of the change in tread configuration and the proximity of the base portions of the ribs to the reinforced crown portion of the tire body. An abrupt change in flexibility of the tread at the base of the ribs is not desirable because it tends to create a region of weakness in the tread at the base of the grooves where there is a concentration of stresses resulting from flexing of the ribs and stretching of the tread.

It is an object of the invention to provide a tire tread having reinforced ribs with straight sides and divided rib faces in the raidally outer portions and with protuberances at the radially inner portions for skid resistance and traction after the outer divided rib portions are worn away.

Further objects are to provide skid-resistance and traction throughout the life of the tire; to provide quietness of operation; to provide a gradual decrease in flexibility of the tread from the tread face radially inward to the tire body; to provide increased wear resistance; and to provide for simplicity of construction and ease of manufacture.

These and other objects will be apparent from the following description and from the drawings in which:

Fig. 1 is an elevation of a tire constructed in accordance with and embodying the invention.

Fig. 2 is a plan view on an enlarged scale of the tire shown in Fig. 1, parts being broken away.

Fig. 3 is a section on an enlarged scale taken along line 3—3 of Fig. 2, parts being broken away.

Fig. 4 is a view like Fig. 2 showing the tire after the radially outer rib portions of the tread are worn away.

Referring to the drawings, a tire 10 is shown which may be hollow and annular for use with or without an inflatable inner tube. The tire 10 has a tire body 11 of resilient rubber or other rubber-like material with a crown portion 12 and bead portions 13, 13 radially inward of the crown portion and connected to the crown portion by sidewalls 14, 14. As shown in Fig. 3 reinforcing plies 15, 15 of suitable weftless or weak wefted cord fabric construction are embedded in the tire body 11 and may extend from bead portion 13 to bead portion 13 through the crown portion 12 and sidewalls 14, 14 to form a unitary hollow annular structure with an opening between the bead portions 13, 13.

A tread 16 is disposed radially outward of the crown portion 12 and may be of resilient rubber or other suitable rubber-like material which is molded integral with the tire body 11. Circumferentially continuous ribs 17, 17 separated by grooves 18, 18 are disposed in the tread face at spaced-apart positions across the tread. Preferably a plurality of ribs 17, 17 are used and may be around seven in number as shown in Fig. 2. The grooves 18, 18 have a depth less than the thickness of the tread 16 and have bottom faces with rounded corners to mitigate stress concentrations at the base of the ribs 17, 17.

Radially outer portions 19, 19 of the ribs 17, 17 which preferably constitute about one-half the height of the ribs may be divided into a multiplicity of segments 21, 21 by transverse dividing means such as slits, slots, inserts or the like. Preferably the radially outer portions 19, 19 are divided by closely spaced slits 22, 22 which may be cut into the ribs 17, 17 without removal of tread material. The closely-spaced slits 22, 22 divide the ribs 17, 17 into thin segments 21, 21 with a large degree of flexibility and a large number of transverse traction and skid-resisting edges.

Radially inner portions 23, 23 of the ribs 17, 17 have protuberances 24, 24 projecting in a generally lateral direction from the ribs into the grooves 18, 18 and extending down to the bottom of the grooves. These protuberances 24, 24 are preferably in the walls of the ribs 17, 17 facing away from the center of the tread 16 for providing skid-resistance and traction after the radially outer portions 19, 19 are worn away. Preferably the protuberances 24, 24 extend from positions on the wall of one rib to positions at the rounded corner of the groove at the base of the wall of an adjacent rib providing sloping elements which have their greatest thickness at the bottom of the groove. As shown in the drawings it is desirable that the protuberances 24, 24 have plane faces 25, 25 which intersect in substantially sharp edges 26, 26. The protuberances 24, 24 may be spaced circumferentially of the tire and the protuberances in the various ribs 17, 17 may be disposed in suitable staggered relationship to provide the maximum of skid-resistance and traction with a minimum of sound.

In operation of the tire 10 the divided outer portions 19, 19 with the closely spaced slits 22, 22 and multiplicity of segments 21, 21 provide a high degree of traction and skid-resistance. The straight sides of the ribs 17, 17 produce a minimum of sound and therefore practically the only sound which the tire makes in operation is produced by the slits 21, 21 and segments 22, 22. Since the amount of sound which can be heard when the closely spaced slits are used is very small a tire results which is desirably quiet in operation.

The radially outer portions 19, 19 of the ribs 17, 17 have an optimum amount of flexibility because of the closely spaced slits 22, 22. The crown portion 12 which underlies the tread 16 is relatively stiff and the inner portions 23, 23 of the ribs 17, 17 which lie between the flexible outer portions 19, 19 and the crown portion are less flexible than the radially outer portions and substantially more flexible than the crown portion. To reduce the effect of the change of flexibility between these portions of the tire the protuberances 24, 24 support the ribs 17, 17 in a manner such that the flexibility of the ribs is gradually decreased towards the base of the ribs providing a gradual transition from the flexible ribs to the relatively stiff crown portion 12. By stiffening the ribs 17, 17 with the sloping reinforcing protuberances 24, 24 the stress concentration at the base of the ribs resulting from flexing of the ribs is reduced providing a tire of increased durability.

As shown in Fig. 4, after the radially outer portions 19, 19 of the ribs 17, 17 wear away the protuberances 24, 24 are projected into the tread face and form triangular sharp-edged skid-resisting traction elements along the walls of the ribs. With the wearing away of the highly flexible outer portions 19, 19 the forces acting on the tread 16 which were dissipated by the flexible segments 21, 21 tend to increase the flexing of the ribs relative to the tire body. It will be seen that as the ribs 17, 17 wear away into the radially inner portions 23, 23 of the ribs the protuberances 24, 24 provide longer traction and skid-resisting edges and therefore compensate for the loss in skid-resistance and traction caused by the reduction in flexibility of the ribs.

Variations may be made without departing from the scope of the invention as it is defined in the following claim.

I claim:

A tire tread having a plurality of circumferentially extending ribs and grooves, the radially outer portions of said ribs having substantially straight sides and being divided in a direction transversely of the tire into a multiplicity of tread segments, a plurality of circumferentially spaced-apart protuberances in the walls of the radially inner portions of said ribs, said protuberances extending into said grooves from the walls of said ribs and to the base of said grooves, and each of said protuberances having plane faces intersecting in an edge, said plane faces being disposed so that said edge extends from a position on the wall of one of said ribs radially inwardly of the rib periphery to a position at the base of the groove in the proximity of the facing sidewall of an adjacent rib to provide said ribs at the tread face with skid-resisting traction projections that function after the divided portions of the rib have worn subtsantially, said protuberances being of gradually increased cross-sectional area as sections are taken moving in a direction from the intersection of said edge with the rib sidewall to the base of the grooves.

References Cited in the file of this patent

UNITED STATES PATENTS

| | | |
|---|---|---|
| 2,121,955 | Eger | June 28, 1938 |
| 2,254,778 | Hoover | Sept. 2, 1941 |
| 2,265,543 | Overman | Dec. 9, 1941 |